US008633968B2

(12) United States Patent
Kennedy

(10) Patent No.: US 8,633,968 B2
(45) Date of Patent: Jan. 21, 2014

(54) THREE-DIMENSIONAL RECORDING AND DISPLAY SYSTEM USING NEAR- AND DISTAL-FOCUSED IMAGES

(75) Inventor: John T. Kennedy, Denver, CO (US)

(73) Assignee: Dish Network L.L.C., Englewood, CO (US)

( * ) Notice: Subject to any disclaimer, the term of this patent is extended or adjusted under 35 U.S.C. 154(b) by 852 days.

(21) Appl. No.: 12/636,570

(22) Filed: Dec. 11, 2009

(65) Prior Publication Data

US 2011/0141239 A1 Jun. 16, 2011

(51) Int. Cl.
*H04N 13/02* (2006.01)
(52) U.S. Cl.
USPC .............................................. 348/46; 348/43
(58) Field of Classification Search
USPC ..................................................... 348/43, 46
See application file for complete search history.

(56) References Cited

U.S. PATENT DOCUMENTS

| 4,881,125 | A * | 11/1989 | Krause ........................... 348/448 |
| 5,990,470 | A * | 11/1999 | Classens ..................... 250/208.1 |
| 7,030,902 | B2 * | 4/2006 | Jacobs .......................... 348/42 |
| 2005/0141863 | A1 * | 6/2005 | De Haan .......................... 386/69 |
| 2006/0054787 | A1 * | 3/2006 | Olsen et al. ................. 250/208.1 |
| 2007/0268967 | A1 * | 11/2007 | Demos ..................... 375/240.15 |

FOREIGN PATENT DOCUMENTS

WO 2006/133133 A2 12/2006

OTHER PUBLICATIONS

Author Unknown, 3D Image Generation Innovation, publicly availabke through internet search engine, known at least as earrly Feb. 27, 2009.*

Yale Film Studies "Yale Film Studies—Part 3: Cinematography-Racking Focus", http://classes.yale.edu/film-analysis/index.htm. Jan. 29, 2008 URL: http://web/archinve.org/web/20080129153502/http://classes.yale.edu/film-analysis/index.htm.*
ilya80, jogiba, falconeye at PENTAX forums: "Discussion at PENTAXforums—Controlling aperture while filming", Sep. 24, 2009.*
Invitation to Pay Additional Fees and Partial International Search Report dated Mar. 11, 2011, PCT/US2010/058412, 8 pages.
International Search Report and Written Opinion dated Jun. 7, 2011, PCT/2010/058412, 19 pages.
PENTAXForums: Discussion at PENTAXforums—Controlling Aperture While Filming http://www.pentaxforums.com/forums/pentax-video-forum/74044-aperture-control-during-video-shotting-k-x.html, Sep. 20, 2009, 1 page.
Yale Film Studies—part 3: Cinematography—Racking Focus Citation http://web.archive.org/web/20080129153502/classes.yale.edu/film-analysis/index.htm, known at least as early as Dec. 11, 2009, 1 page.
Author Unknown, 3D Image Generation Innovation, publicly available through internet search engine, known at least as early as Feb. 27, 2009, 4 pages.
Author Unknown, The Eye Muscles—Accomodation & Vergence [sic], publicly available through internet search engine, known at least as early as Feb. 27, 2009, 3 pages.

* cited by examiner

*Primary Examiner* — Sath V Pernugavoor
*Assistant Examiner* — Jeffery Williams
(74) *Attorney, Agent, or Firm* — Kilpatrick Townsend & Stockton LLP

(57) ABSTRACT

Methods and apparatuses for providing simulated three-dimensional images on a two-dimensional display screen without the use of special filters or overlays on the display or special eyewear. Images having different focal points are displayed as pictures and switched between rapidly, such that the human eye automatically adjusts to focus on each picture in succession. As the pictures are presented sequentially, the viewer may perceive that the display shows images at different depth planes. The number of depth planes may vary between embodiments.

14 Claims, 6 Drawing Sheets

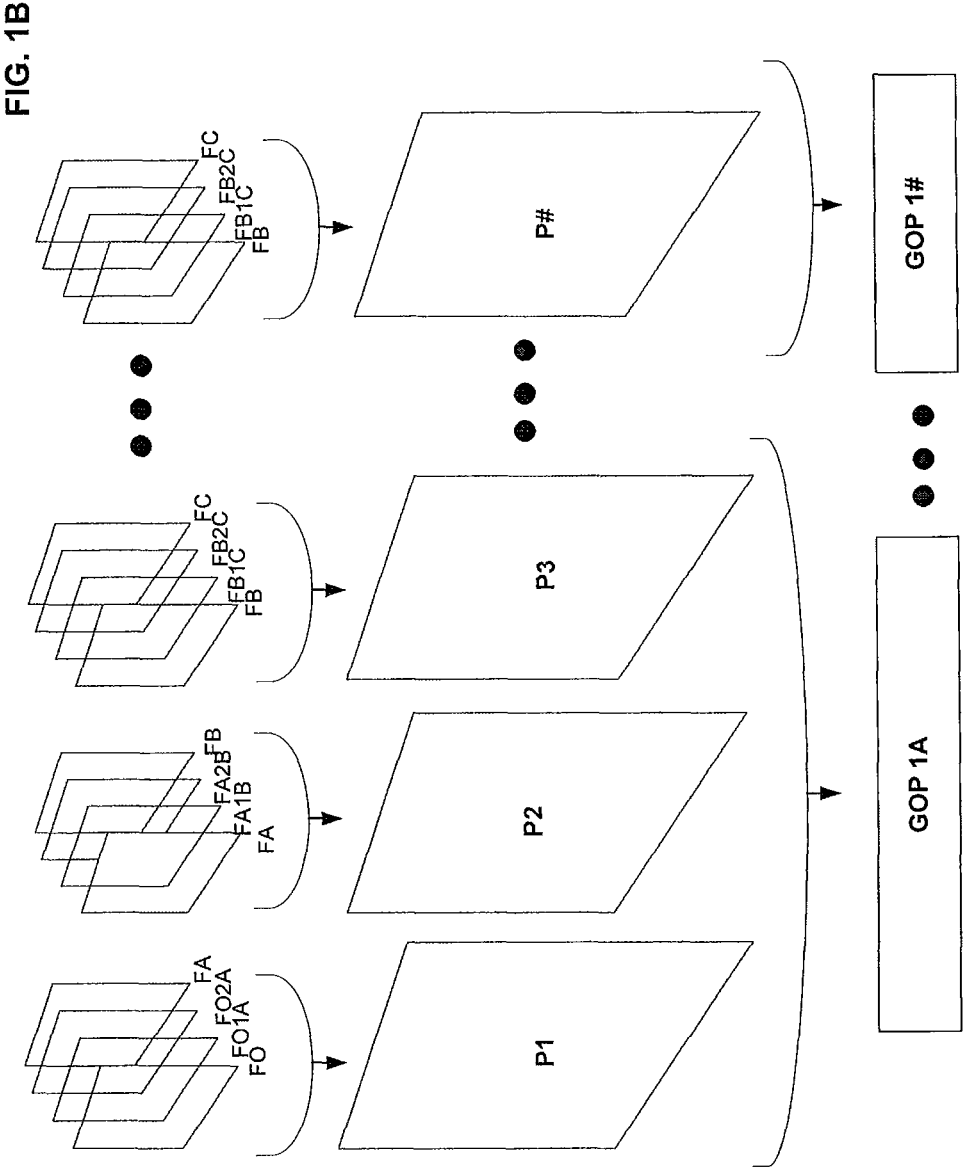

THREE-DIMENSIONAL RECORDING AND DISPLAY SYSTEM USING NEAR- AND DISTAL-FOCUSED IMAGES

TECHNICAL FIELD

The technical field relates generally to display systems and methodologies capable of simulating three-dimensional images, and more particularly to display systems and methodologies capable of simulating three-dimensional images through the use of near-focused and distal-focused images as well as systems and methodologies capable of capturing three-dimensional images through the use of adaptive aperture and/or focal settings in image capturing device or system.

BACKGROUND

Television in its familiar, two-dimensional display format has existed since the 1930s, and in even earlier incarnations since the late 1800s. Films have existed for an even longer period. Despite many advances since their inceptions, television and film technology have largely been confined to two-dimensional displays.

Certain modern technologies attempt to simulate three-dimensional displays on a flat two-dimensional surface (such as a television or a movie screen) through the use of specialized eyewear. Other attempts to simulate three-dimensional displays rely on placing overlays on a display surface or device, while still others require specialized screens integrated into the display device. Given the proliferation of televisions, projectors and other video display devices in the household, many consumers may be reluctant to purchase new equipment to view simulated three-dimensional programs.

DESCRIPTION OF THE FIGURES

FIG. 1B depicts a group of frames that, taken together, form a group of pictures or "GOP."

SUMMARY

Figure 1A:
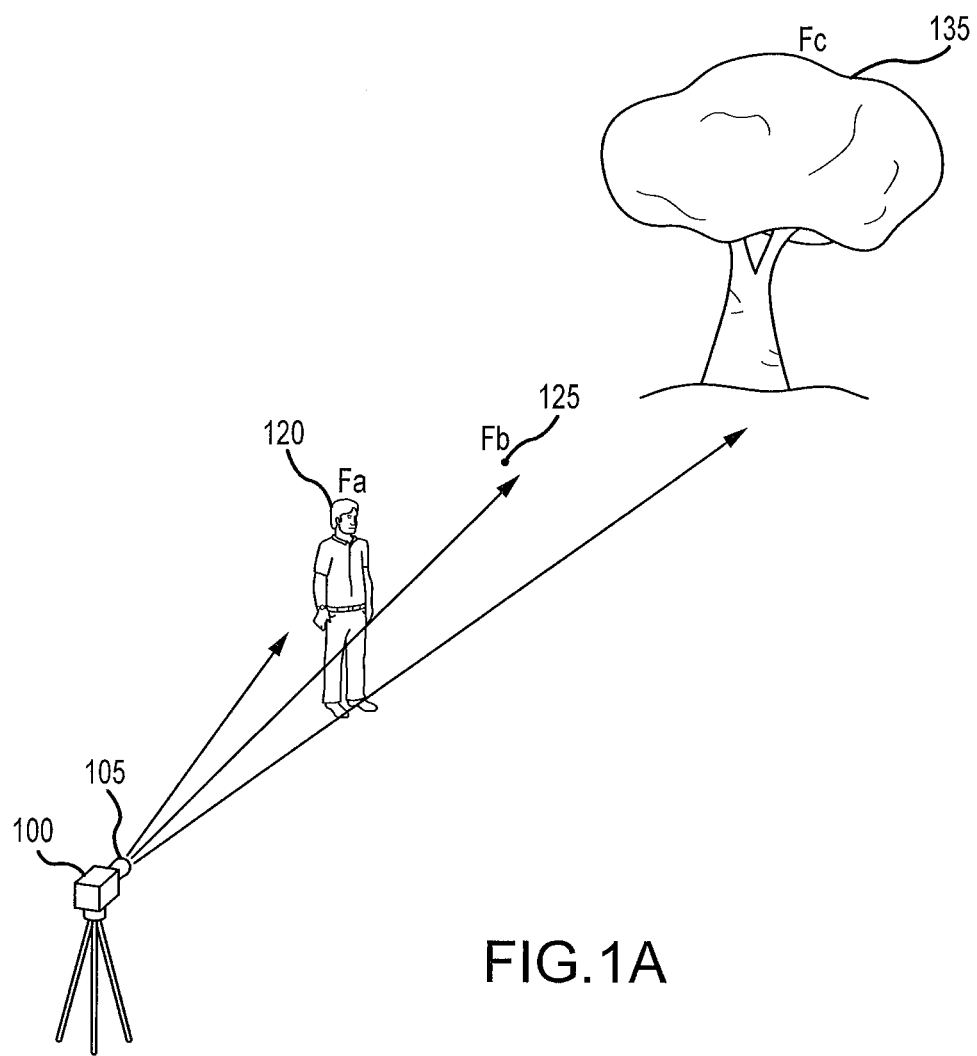
FIG. 1A illustrates a sample system for capturing images in a sample environment.

One embodiment takes the form of a method for creating an output stream, including the operations of: focusing on a first focal point; capturing a first series of images having a first depth of field corresponding to the first focal point; focusing on a second focal point; capturing a second series of images having a second depth of field corresponding to the second focal point, the second depth of field different than the first depth of field; placing at least a portion of the second series of images after a first portion of the first series of images; and placing a second portion of the first series of images after the at least a portion of the second series of images; wherein the first portion of the first series of images, the at least a portion of the second series of images, and the second portion of the first series of images form an output stream.

Another embodiment takes the form of a method for creating an output stream, including the operations of focusing an imaging capturing device having an aperture and at least one lens focused on a first focal point, capturing a first image of a scene having a first depth of field at the first focal point, adjusting the aperture of the image capturing device from a first aperture to at least one second aperture, and capturing at least one second image of the scene at the first focal point for each of the at least one second aperture, wherein the first aperture and the at least one second aperture result in the capturing of the scene at multiple depths of field corresponding to the first focal point.

Another embodiment takes the form of a method for displaying an output stream, including the operations of receiving the output stream; displaying a first image in the output stream, the first image corresponding to a first depth of field; after a first transition time, displaying a second image in the output stream, the second image corresponding to a second depth of field; after a second transition time, displaying a third image in the output stream, the third image corresponding to the first depth of field, wherein the first and second transition times permit the human eye to refocus between the first and second depths of field.

Still another embodiment takes the form of an apparatus for capturing multiple series of images, including: a first image capture element; a second image capture element; a first lens optically coupled to the first image capture element; a second lens optically coupled to the second image capture element; and a housing enclosing at least the first image capture element and second image capture element.

DETAILED DESCRIPTION

I. Introduction and Definitions

Generally, embodiments described herein may provide simulated three-dimensional pictures on a display device, as defined further herein below, such as a television, computer monitor, heads up display, movie theater screen, video eyewear, or the like. For at least one embodiment, the simulated three-dimensional pictures are created, by presenting multiple image captures of a scene at a given point of time (hereinafter, each image capture a "frame" and a collection of image captures for a given scene, at a given point in time a "picture"), wherein each of the frames may vary from preceding or succeeding frames in focal point, luminosity, and/or a depth of field corresponding to any given focal point and wherein each picture may vary, in terms of a picture's aggregate frame or frames, from any preceding or succeeding picture in time, focal length, luminosity, depth of field, motion presence or absence, and the like. Further, each image captured of a scene, and the corresponding pictures and frames for such capture may vary throughout a presentation of the scene by focal distance, perceived angle of view (e.g., deft or right of a given reference location), elevation (e.g., up or down from a given reference plane), and the like.

Each of the frames for a given picture may be presented in any given sequence, at any given periodicity and for any given duration in conjunction with the presentation of one or more pictures. Variations in any given scene presentation may occur in terms of focal point, luminosity, depth of field and/or motion presence or absence, as accomplished by frame-to-frame and/or picture-to-picture variations in the foregoing. Such variations desirably resulting in the human eye automatically adjusting to such variations so that the corresponding human brain perceives a given image and/or a given scene in varying levels of detail and/or motion and thereby renders, in the human brain, a perceived three dimensional view of the given image and/or scene.

As the pictures and the frames corresponding thereto are presented, the viewer may perceive that the display shows an image at different depths of field (referred to herein as "depth planes") as well as displaying the image, in the case of motion video, as containing corresponding motion. The number of depth planes may vary between embodiments and may vary based upon the presence or absence of motion between pictures and, when such motion is present, the rate of change in visually perceptible image elements between successive pictures.

Continuing the overview, an appropriately configured image capturing device (hereinafter, a "camera") may capture images (either still, or video) of a scene at different focal points, luminosity and/or depth of field. For example, the camera may film or otherwise capture an image at a first depth plane and simultaneously, or sequentially, capture the image at a second depth plane. Typically, each focal point lies within a corresponding depth plane. Such image captures, at the corresponding depth planes, can occur on a frame-by-frame and/or picture-by-picture basis. Such image capture may also, as desired, account for the presence or absence of motion in the scene.

Continuing the example, the image may be captured such that the foreground is in focus in one series of frames and the background in focus in a second series of frames. Thus, it can be seen that multiple objects, although not arranged in a planar fashion, may be in focus in a single depth plane.

The first and second series of frames may be interleaved to form an output stream for display on the display device. In this manner, the display device, when showing the output stream, may show still or video frames and/or pictures of an image that have different depth planes due to the changing focal points. In effect, for an output stream having two series of frames, pictures and/or images, the stream may vary between the first and second focal points, thereby creating the illusion of a three-dimensional image. Embodiments may interpolate intermediate frames for inclusion in the output display, to smooth the transition between the first and second series of frames and to smooth transitions between pictures and/or images.

It should be appreciated that the three-dimensionality of the aforementioned image may be limited by the number of series of frames (e.g., number of focal points) captured and interleaved to create the output stream. Thus, the more frames captured at varying focal points, luminosity and/or depth of field, the finer the granularity of the three-dimensional effect that may be achieved on the display device. It should also be appreciated that the output stream may be constructed such that multiple images and/or pictures from an image capture of a scene are shown together. That is, there is no requirement that only one picture in a row come from a particular series. These concepts will be addressed in greater detail below.

As used herein, the term "display device" generally refers to any electronic device capable of displaying visual information, such as a television, projector, computer display, display surface of a mobile device, heads up display, video eyewear, and so forth. A "camera" encompasses any device capable of capturing still images and/or video images, such images including one or more pictures which include one or more frames. An image may be captured in the digital or analog domains and converted into a proper format for presentation to a viewer. As discussed above, a "frame" refers to a single instance of an image or video, whether a frame, field, or otherwise. Multiple frames may be combined to create a video sequence or a still image persisting for a length of time, i.e. a picture. Multiple pictures may be combined to create a "movie." An "movie," for purposes of this document, includes both still pictures and video.

An "output stream," as used herein, covers any visual data created from multiple series of frames and/or pictures, each series may correspond to a different depth plane, focal point, and/or luminosity. Thus, output streams are typically ultimately intended for display on some form of display device, although they may be digitized, multiplexed and otherwise processed prior to display. Both analog film and digital data may be an output stream in different embodiments.

II. Characteristics of the Human Eye and Display Devices

Generally, the human eye controls its focal point through a series of interconnected actions, known as vergence, accommodation and miosis/mydriasis. Each of these three actions operates together to focus the eye on a particular object, at a particular distance, thus defining the focal point of the eye. Embodiments described herein may take advantage of the focusing and refocusing of the eye to simulate a three-dimensional viewing experience through manipulation of images shown on a two-dimensional display device.

"Vergence" refers to the simultaneous movement of both eyes in opposite directions, which occurs to provide binocular vision. Convergence is the motion of both eyes towards each other in order to look at an object closer than the eyes' current focal depth, while divergence is the motion of both eyes away from each other to look at an object further away. Generally, a person's eyes rotate around a vertical axis when looking at an object in order to keep the object in the center of the retinas. Thus, convergence is typically a rotation of the eyes toward one another and divergence is a rotation away.

"Accommodation" is the act of refocusing the eyes through changing the curvature of the lens in each eye. A ciliary muscle in the eye may act to apply pressure or relax the lens, thereby assisting in changing the eye's focus from far to near. Typically, accommodation is accompanied by vergence, and vice versa.

The constriction of the pupils in the eye is called miosis, while the dilation of the pupil is called mydriasis. In addition to controlling the amount of light that enters the eye, the acts of miosis/mydriasis may assist in focusing the eye. Essentially, contracting or dilating the pupil may act to change the aperture of the eye. As aperture changes, the depth of field of the eye may likewise change.

Continuing the discussion, vergence across a 10 degree angle may occur in about 40 milliseconds, with latency under 200 milliseconds. Likewise, accommodation may occur in approximately 560 to 640 milliseconds, with a latency of approximately 350 milliseconds. It should be noted that the speed of the eye's operations, as well as the latencies set forth above, may vary from individual to individual as well as with the nature of the visual stimulus. For example, accommodation may begin more quickly (e.g., with reduced latency) if following a saccade. Accordingly, these numbers are provided for illustration only.

Generally, current display devices operate at a variety of refresh rates. Display devices conforming to the NTSC video standard output approximately a 60 Hz signal of roughly 30 fields per second. Display devices conforming to the PAL video standard use a 50 Hz refresh rate having 25 interlaced fields per second. Most movie projectors display 24 frames per second. By contrast, many display devices accepting digital output streams may operate at higher frame rates. For example, LCD computer monitors often have a 60+ Hz refresh rate and may display one frame per refresh. Further, LED monitors commonly have a minimum refresh rate of 240 Hz and can be obtained with refresh rates as high as 2000 Hz. Display devices may be configured to operate at even faster refresh rates and thus provide even more frames per second.

III. Capturing Images Having Differing Depth Planes

FIG. 1A illustrates a sample system for capturing images in a sample environment. A camera 100 includes a lens 105 with an adjustable aperture. As the aperture adjusts, the depth plane in focus for the camera 100 varies. Thus, the camera 100 may focus on a man at focal point Fa 120, a tree at focal point Fc 135, anywhere in between, and so on. The camera 100 may have the lens 105 aperture set to place the man in the depth plane at a filming time T1. The aperture may be adjusted such that at filming time T2 the tree is in the depth plane. Depending on the aperture, distance between the man and tree, and other factors, the man may be outside the depth plane that includes the tree. At a time T3, the camera may return to the depth plane established by the focal point Fa. Thus, the aperture of the lens 105 may change at a desired rate and periodicity during image capture, such that the focal point being filmed transitions. In this manner, multiple series of frames may be captured rapidly, each at a different effective depth of field distance and each having a different depth plane. In addition to creating different depth planes through aperture changes, the camera 100 may be re-focused but the aperture maintained in order to capture images at differing depth planes.

In between time T1 and T2, for example when transitioning from focal point Fa 120 to focal point Fb 125, the camera 100 may capture frames at intermediate depth planes, such as planes FA1 and FA2, as shown in FIG. 1B. These frames may be grouped into a picture, such as picture P2. The number of these intermediate depth planes may vary; each typically corresponds to a unique series of frames, which may be grouped as pictures, such as picture P3, in addition to those taken at focal points Fa and Fb. Further, a series of frames may be taken at a point Fo nearer the camera 100 than focal point Fa 120 and grouped such as picture P1, or further from the camera than focal point Fc 135, to provide additional series of frames and pictures defined on additional depth planes. For purposes of this example, presume the camera captures a third series of frames at a depth plane defined by focal point Fb 125, which is in between focal points Fa and Fc.

As further shown in FIG. 1B, a picture (e.g., P1) including a series of frames (e.g., FO, FO1A, FO2A and FA) may be further grouped with other pictures (e.g., P2 and P3) to provide a group of pictures "GOP" (e.g., GOP 1A). A GOP may be further combined with successive groups of pictures (e.g., GOP1#) to provide for motion compensation information between GOP. In one embodiment a suitable number of GOPs can be provided per each second to accomplish motion picture and 3D picture generation while presenting a movie with an acceptable image quality.

It should be noted that, because the camera 100 is not moving but only adjusting the aperture of the lens 105, the size, object in and composition of the captured images in both series of pictures is roughly identical. In this example, the objects in focus change, but whether those objects are in the captured image do not. Should objects move or the camera 100 move, then the images in each series of pictures may well vary.

It should also be noted that the time lapse between times T1 and T2 need not equal that between times T2 and T3. That is, the camera 100 may linger on a particular focal point longer than another. Similarly, the camera may devote a longer time to filming at one depth plane than another. Likewise, a camera may be configured to repeat frames, pictures, and GOPs in any desired sequence to accomplish the generation of an image having certain 3D and, as desired, motion characteristics. As an example, the camera may shoot two images in the first series of pictures at focal point Fa 120, then three images in the second series of pictures at focal point Fb 125 and continue this ratio as long as desired. It will also be appreciated that other image capture ratios may be used, including even ratios. Generally, the higher the proportion of the ratio associated a certain series of images, the more emphasis given to that depth plane in the three-dimensional effect described below.

Figure 2:
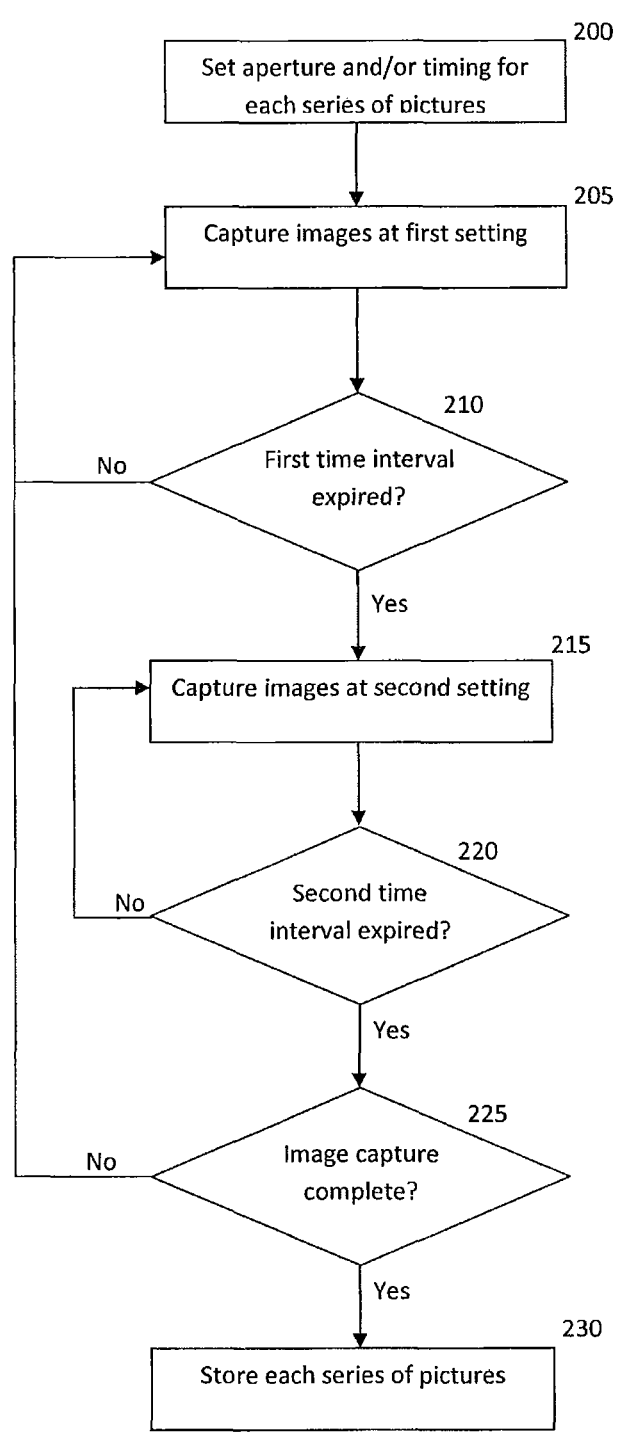
FIG. 2 is a flowchart depicting operations that may be undertaken by the embodiment of FIG. 1A.

FIG. 2 is a flowchart depicting operations that may be undertaken by the camera 100 of FIG. 1A, or another embodiment. Initially, in operation 200, the aperture for each series of frames is set. This may be done, for example, by a camera operator. By specifying the aperture setting used to create each series of frames, the depth planes may be defined and the camera operator need not manually adjust the camera aperture. It should be appreciated that the length of time at which the camera 100 maintains a particular aperture setting may also be specified in operation 200. Thus, the camera may adjust the lens aperture according to a particular timing scheme, if desired.

In operation 205 the camera 100 captures images at a first aperture setting, thereby creating at least a portion of a first series of frames.

In operation 210, the embodiment determines if a time interval during which the camera captures images at the first depth plane has elapsed. With respect to the example of FIG. 1A, this would be the duration between times T1 and T2. Returning to FIG. 2, the time checked in operation 210 may be set during operation 200. In the event this time has not elapsed, the embodiment returns to operation 205. In certain embodiments, a number of captured frames may be set instead of a time.

In the event that embodiment determines the appropriate time has passed in operation 210, operation 215 is executed. In operation 215, the aperture of the lens 105 is adjusted to focus the camera 100 on the second depth plane (for example, the depth plane determined by the focal point Fb 125 in FIG. 1A). The camera 100 may then capture at least a portion of the second series of frames as part of operation 215.

In operation 220, the embodiment determines if a second time interval has elapsed. This second time interval, which again may be specified in operation 200, represents the length of time during which the camera 100 captures images in the second depth plane. As with operation 210, a certain number of frames may be specified instead of a temporal duration. Presuming this second interval has not elapsed, the embodiment continues to capture images in operation 215.

If, however, the second time interval has elapsed, then operation 225 is executed and the embodiment determines whether or not the image capture sequence is complete. If not, the embodiment returns to operation 205. Otherwise, the embodiment executes operation 230.

In operation 230, the embodiment may store each series of frames (presuming the embodiment is not solely a film-based camera). Typically, although not necessarily, each series of frames is stored separately from one another. It is to be appreciated that any number of frames may be stored separately or in groups of frames, pictures, GOPs or otherwise. By storing each series separately, an editor or other content composer may choose or create certain simulated three-dimensional effects without requiring a scene be re-shot to obtain additional frames at certain depth planes. Each frame in each series may be tagged with a timestamp so that an editor or other content composer may easily cross-reference frames when establishing simulated three-dimensional effects.

It should be noted that an operator may generally perform the foregoing operations manually, rather than programming a camera or camera controller to perform the operations. In such a case, the operator may omit operation 200 as redundant. It should also be noted that an external controller, such as a computing device, may be provided to execute the method shown in FIG. 2. The external controller may electronically connect to the camera 100 and execute the foregoing functions.

FIG. 2 has been described with respect to a first and second series of frames, e.g., with respect to two depth planes. It should be appreciated that three or more depth planes may be defined and captured, each with its own series of frames, pictures, and GOPs, as the case may be In such a case, a third, fourth, . . . Nth time interval and/or aperture setting may be defined, and operations similar to those in operations 215-220 executed for each corresponding series of frames. Typically, operation 225 is performed after all such iterations are completed. It should be appreciated, however, that more complex aperture and timing specifications may be made, which may cause the order of such iterations to vary by embodiment.

Further, multiple aperture settings may be used to define intermediate depth planes between, for example, two primary depth planes. Returning briefly to FIG. 1A, the depth plane defined by the focal point Fb is one such intermediate depth plane. The series of pictures captured at these intermediate fields may be used to interpolate or transition between the two primary depth planes when creating an output stream, as described below.

In certain embodiments, it may be useful to consider the playback speed of the output stream when capturing series of frames. For example, the overall speed at which all series of frames are captured may be 60 Hz to match the playback rate of NTSC-compliant display devices. Alternative embodiments may capture a different number of frames per second, such as 24 or 50, to match the display capabilities of film or PAL display devices, respectively. In these embodiments, the camera 100 may cycle sufficiently rapidly through the various depth planes to ensure that each series of frames is captured at least at the appropriate rate. For example, presume a camera can modify its aperture setting 400 times per second (to use an arbitrary number) and there are three separate depth planes, with the third depth plane being captured twice as long as the first and second depth planes (e.g., a 1-1-2 timing). In such an example, the camera may capture the first and second series of frames at 100 Hz and the third series of frames at 200 Hz, then pull down the frame rate as necessary to match the 60 Hz output. Alternative embodiments may capture frames at a multiple or fraction of a playback rate to minimize or eliminate the need for pulldown conversion.

In other embodiments, each series of frames may be captured at a variable rate. For example, if the output stream to be created from the series of frames is to be played on a television, then it may be assumed the playback speed is approximately 60 fields per second, or 60 Hz. The camera may be set to capture no more than 60 frames per second across all depth planes, with the specified timing of operation 200 indicating how many frames are captured at each aperture setting.

Generally, it may be useful to keep the image capture rate of each series of frames above approximately 16 frames per second, which is about the threshold at which the human eye discerns flicker or jerkiness in movies, television programs and other content that uses motion blur techniques to smooth transitions between frames.

IV. Alternative Embodiment

Figure 3:
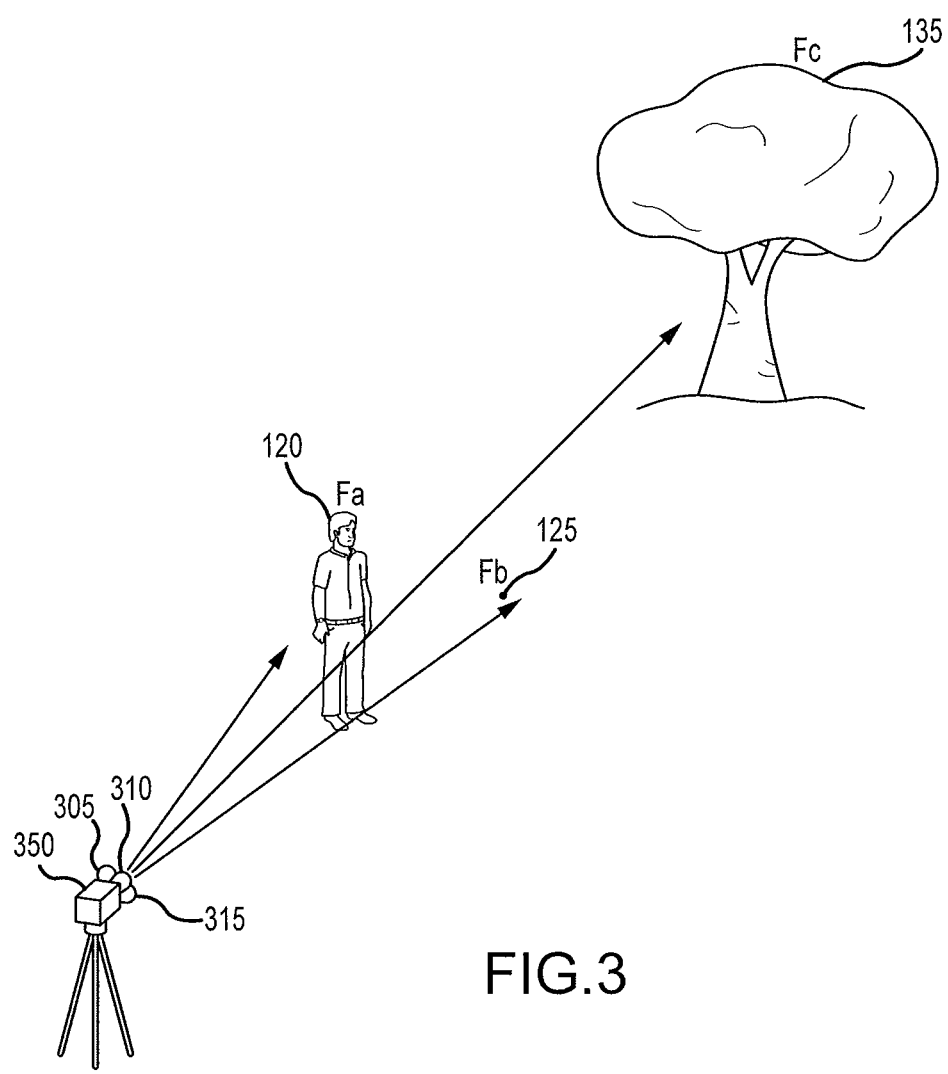
FIG. 3 depicts an alternative embodiment of a camera 300 that may be used to captures multiple series of images, each with a different depth plane.

FIG. 3 depicts an alternative embodiment of a camera 300 that may be used to captures multiple series of images, each with a different depth plane. Unlike the camera 100 shown in FIG. 1A, this camera 300 includes multiple lens arrays 305, 310, 315. The aperture of each lens array may be independently set, such that each lens focuses on a different focal point 120, 125, 135 and thereby captures its series of pictures in a different depth plane. It should be appreciated that the lens arrays may facilitate image capture through conventional film or in a digital format. Thus, the lens arrays may each be coupled to a distinct digital camera element, such as a charge-coupled device image sensor or other appropriate digital sensor.

In operation, the camera 300 acts similarly to the camera 100 of FIG. 1A. Since it includes multiple lenses 305, 310, 315 that may be set to different apertures, the camera may simultaneously record each series of frames without switching between different focal lengths. Accordingly, certain operations set out in FIG. 2 are not performed by the camera 300 of FIG. 3. For example, operations 210 and 220 may not be executed. Likewise, in operation 200, timing information may not be provided.

It should be appreciated that each lens 305, 310, 315 may be arranged equidistant from a midpoint on the face of the camera 300. Thus, although the series of frames captured through each lens may be slightly offset from one another, translation of the individual frames to a common point may be easily accomplished. This may be done through a simple shifting of X-Y coordinates according to known values or a more complex translation may account for variations in the image due to difference in angle between the lenses.

V. Creating and Transmitting an Output Stream

Once the various series of frames are captured, they may be combined into a single output stream to simulate three-dimensional viewing, such as that provided through binocular vision. The process of creating the output stream is described herein.

Initially, if the camera captured each series of frames in the sequence desired, then no intervention by an editor is necessary. Instead, the final sequence of the various series of frames, pictures and/or GOPs has already been captured and the data captured by the camera 100 may be subjected to compression and transmission, as described below. This may be especially advantageous with live or near-live performances, such as sporting events, in that they may be captured and a simulated three-dimensional effect provided with little or no delay.

Presuming the camera 100 stored each series of frames separately as described in operation 230 of FIG. 2, an editor or other content creator may employ the various series to create the content stream. For simplicity, the term "editor" will be used herein but is intended to cover any person, entity, device or system that manually, semi-automatically and/or automatically creates an output stream from multiple series of frames, pictures and/or GOPs, at different depths of field, focal point, luminosity, levels of motion compensation and/or combinations of the foregoing. The editor may review the captured frames, pictures, and/or GOPs in each series and choose how many different depth planes are to be included in each segment of the output stream.

The editor may also choose how long each series of frames, pictures, and/or GOPs is shown, or how many images in each series is shown before transitioning to another series. In essence, the editor may weave together images from each of the depth planes as desired. In certain embodiments, the editor may wish to create the output stream to return to each series of frames within $\frac{1}{25}^{th}$ of a second. Since afterimages generally linger in the human visual system for approximately $\frac{1}{25}^{th}$ of a second, transitioning between each series of frames, and thus each depth plane, within this time may facilitate the illusion of persistence of vision at each such plane. This, in turn, may enhance the three-dimensional illusion experienced by a viewer.

During this process, the editor may wish to ensure each series of frames maintains a minimum display rate, such as a certain number of frames per second. In this manner, the resulting output stream may minimize or eliminate flicker that could otherwise occur either during transition between series of frames and/or pictures or between the frames and/or pictures showing a single depth plane. Nonetheless, there is no upper or lower limit on the number of images that may be taken from any single series of frames and/or pictures and displayed sequentially. Generally, the more images from a given series of frames and/or pictures displayed per second, the more emphasis that corresponding depth plane may have in a simulated three-dimensional view.

In one embodiment, once the editor has assembled the images in a desired output stream, they may be compressed. In other embodiments, frames, pictures and/or GOPs may be compressed by the camera. decompressed, as necessary for image editing, and recompressed to provide compressed frames, pictures, GOPs and/or movies. Generally, the individual frames and fields in the output stream may be compressed according to any standard compression scheme. For example, the output stream may be separated into I-frames, P-frames and B-frames, with P-frames and B-frames encoding only data that changes with respect to the reference I-frames. The use of I-frames, P-frames and B-frames is well-known, especially with respect to MPEG-1 and MPEG-2 video coding and compression. Similarly, the output stream may be segmented into macroblocks within each frame, or slices within each frame under the H.264/MPEG-4 codec. Compression may occur at the frame, picture and/or GOP level, as desired by system characteristics.

During compression, the embodiment may determine P-frames (or macroblocks, or slices) and/or B-frames (or macroblock, or slices) that not only interpolate between images in the same series but also that compensate for changes between series, or depth planes. Thus, just as a series of frames may be compressed to account for motion of an object shown in the frames, so too may compression operate to reduce the data size of frames that are adjacent in the output stream but display different depth planes. For example and with reference to in FIG. 1B, frame FO might be encoded as an I frame, frame FA as a B frame and frames FO1A and FO2A as P frames. Similarly, picture P1 might be further compressed with respect to pictures P2 through P3, such that GOP 1A is representative of an I frame (of a GOP) and GOP 1# is representative of a B frame (of a GOP). One of ordinary skill in the art will appreciate that lossless or near lossless compression of frames, pictures and GOPs may be achieved by the repetition of frames (e.g., FB occurs in both pictures P2 and P3), pictures and/or GOPs throughout a movie. Accordingly, as the output stream rapidly transitions between images from different series, the images may be compressed according to known techniques based on the changes in images resulting from differences in depth planes or focal points.

Changes in depth planes and/or focal points may occur between pictures and/or GOPs, or even between frames, as necessary or desired to achieve a particular simulated three-dimensional effect.

An output stream or movie, as described herein, may contain multiple series of frames, pictures and/or GOPs, each of which may convey motion to a viewer. Insofar as an editor or content provider may wish to avoid flickering, strobing or stuttering effects in the output stream, it may be advantageous for the output stream to have a higher frame rate than a standard television, film or other audiovisual signal. Thus, some output streams may be encoded at rates ranging from 60 non-interlaced frames per second to rates as high as 2000 frames per second. By increasing the frame rate of the output stream, images from multiple series of frames, pictures and GOPs and showing multiple depth planes may be used without inducing undesired display effects. Although this may increase the bandwidth required to transmit the output stream across a network, compression (as described above) may reduce the overall bandwidth.

It should be noted that compression of the output stream is optional. Likewise, it should be noted that the output stream may be configured to be displayed on a standard or conventional two-dimensional display device, thereby simulating three-dimensional images on the display device. The pictures and/or GOPs may be used to create a single output stream that can be decoded by a receiver and displayed on the display device in this fashion. Thus, it should be understood that multiple output streams are not necessary to implement embodiments described herein.

Pictures with varying depths of field may be captured (and frames created) based not only on a changing aperture of a camera 100, but also through dynamically refocusing a camera. In this manner, the depth of field may vary with focus although the lens aperture does not change. For example, when tracking a moving object coming towards the camera, the camera may stay focused on the object. Thus, as the object moves, the depth of field changes with the camera's focus. Similarly, a first picture may have a wide focus that maintains both a car and a background in focus, while the second picture may have a tighter focus on the car, thus placing the background out of focus. Although these images may have the same focal point, (e.g., on the car), the depth of field may be different.

By capturing pictures having these different depths of field and/or foci, the output stream may be created in a manner similar to that described above which respect to changing focal points achieved via aperture changes. It should be appreciated that a combination of pictures having different foci and aperture settings may be employed together to create an output stream.

Figure 4:
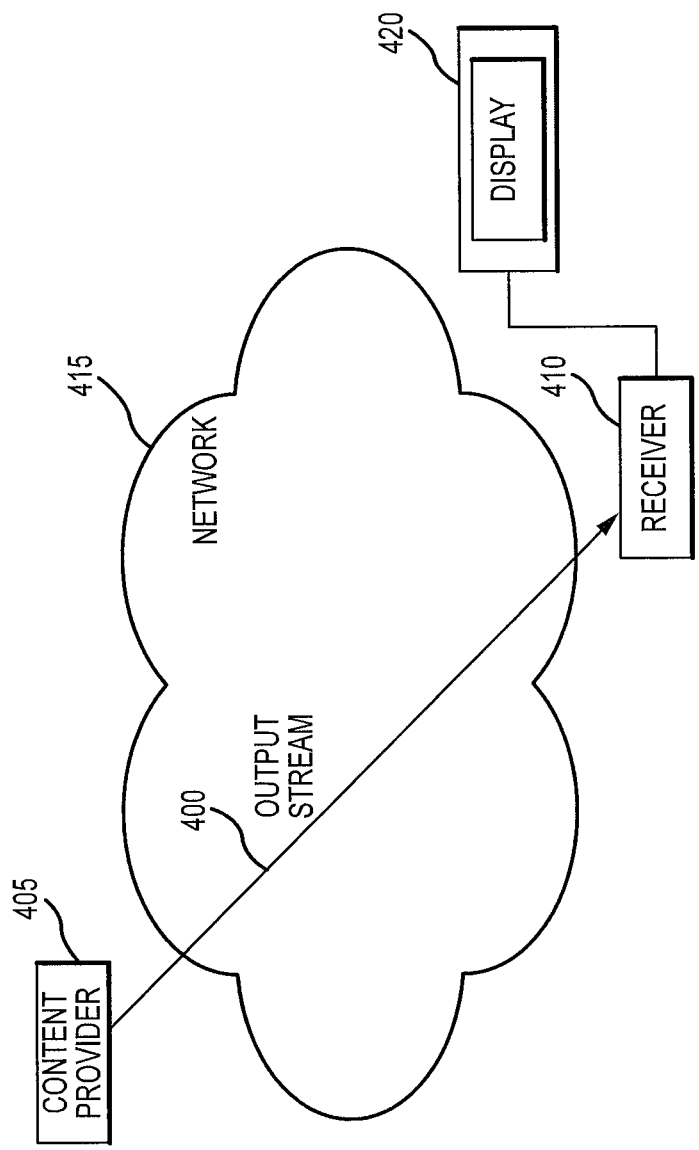
FIG. 4 depicts a generalized environment permitting transmission of an output stream 400 for viewing by an end user.

FIG. 4 depicts a generalized environment permitting transmission of an output stream 400 for viewing by an end user. The output stream 400, once compressed, digitized, multiplexed, and/or otherwise configured, may be transmitted across a network 415 from a content provider 405 to a receiver 410. The network may be any suitable type of network, such as a satellite system, cable system, the Internet, any other wired, wireless or hybrid network, and so on The content provider 405 may exercise control over the network 415 in certain embodiments and may not in others. Thus, for example, the content provider may be a satellite provider transmitting the output stream across a proprietary satellite system. In another embodiment, the content provider 405 may be a server transmitting the stream across the Internet. As yet other options, the output streams discussed herein may be encoded onto a storage medium such as a blu-ray disc, digital versatile disc, and so on.

The receiver 410 may be any type of device configured to accept, recognize and/or process the output stream 400. For example, the receiver may be a set-top box, cable box, computer, handheld device including a personal digital assistant or mobile phone, and so on. Typically, the receiver is connected to or integrated with a display device 420.

VI. Displaying and Viewing an Output Stream

The receiver 410 decodes the output stream 400 and sends it to the display device 420 for viewing by the end user. The displayed output stream shifts between images at different depth planes. As the output stream shifts in this fashion, the end user's eyes may refocus through vergence and/or accommodation to adjust to the change in focal points. Similar refocusing effects may be achieved by changing the luminosity of all or part of a displayed output stream, as discussed in more detail below.

By shifting quickly enough between depth planes, the user's eyes may perceive multiple depth planes simultaneously, just as with binocular vision. This, in turn, may simulate three-dimensional images on the two-dimensional surface of the display device 420. Insofar as the end user's eyes may adjust as quickly as 40 milliseconds to the differing depth planes presented by the output stream, the user's brain may be fooled into believing that the various depth planes are simultaneously viewable and thus generate the illusion of depth.

Luminosity

Figure 5:
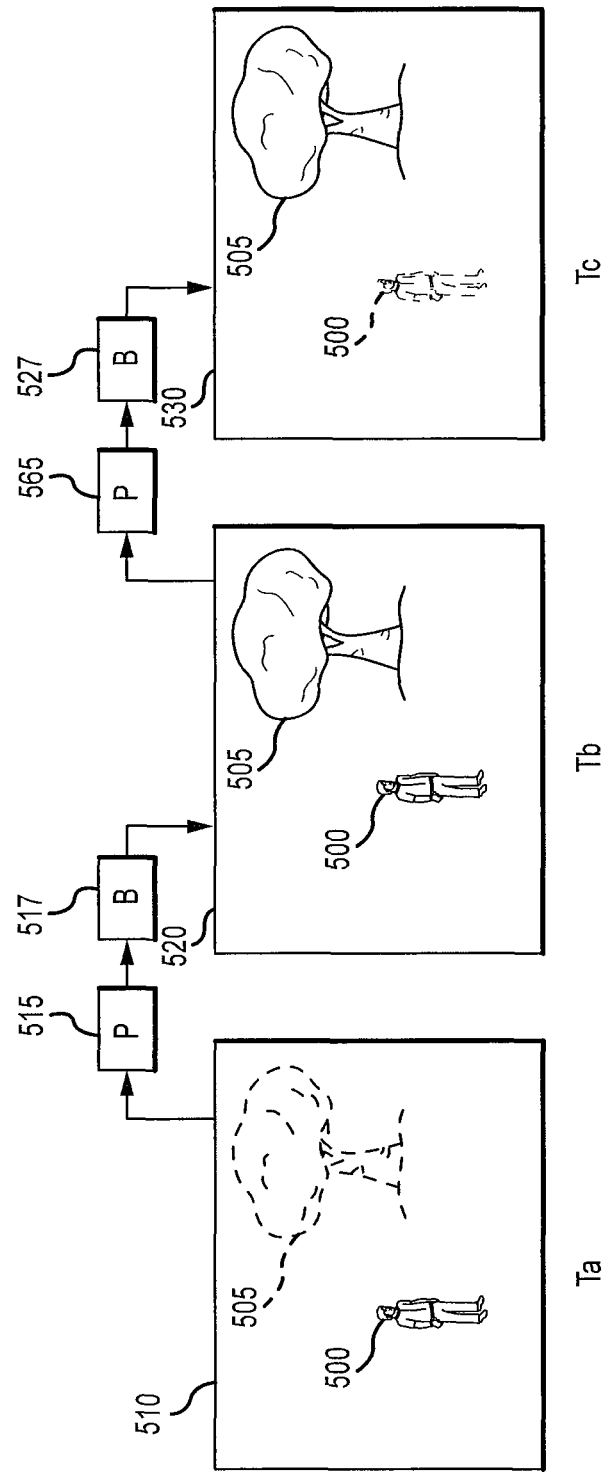
FIG. 5 depicts three pictures that may be shown in sequence on a display device to simulate a three-dimensional image.

It should be appreciated that the frames having varying depth planes nonetheless display substantially the same image, but with different elements of the image in focus. This assists in creating the three-dimensional effect on the display device 420. For example, FIG. 5 depicts three frames 510, 520, 530 that may be shown in sequence on a display device 420. Each frame shows substantially the same elements, which in this example are a man 500 and a tree 505. The man and the tree are captured in different series of frames and so are in different depth planes. Generally, the image 510 corresponds to focal point Fa 120 of FIG. 1A, image 520 corresponds to focal point Fc 135 and image 530 corresponds to focal point Fb 125.

At time Ta, image 510 is displayed. In this image, the man 500 is in focus while the tree 505 is not. At time Tb, image 520 is shown on the display device 420. Insofar as this corresponds to intermediate focal point Fb, both the man 500 and tree 505 may be in focus. Next, at time Tc, image 530 is shown to the end user and the tree is in focus, but the man is not, thus corresponding to focal point Fc.

Since the man and tree appear to be the same size in all three images but the depth of field changes, the illusion of three-dimensionality may be experienced by the end user.

It should be noted that a P-frame 515 and/or B-frame 517 may be shown in between the first image 510 and second image 520 to more smoothly transition between the images. Similarly, a P-frame 525 and/or B-frame 527 may facilitate the transition between the second image 520 and third image 530. Although only one P-frame and one B-frame are shown between each pair of images, multiples of either frame type may be used as necessary or desired.

It should also be noted that a standard receiver 410 and display device 420 may be used to decode and display the output stream 400, so long as the decoding speed of the receiver 410 and refresh rate of the display device 420 are sufficient.

VII. Luminosity Adjustments

In certain embodiments, the data for display on a display device may not only include frames having different focal depths and/or aperture changes, but also varying luminosity. The display stream (e.g., the data stream resulting from processing the output stream by a receiver) may include instructions to change the luminosity of the display device, optionally on a frame-by-frame basis. Since luminosity changes may cause the human pupil to constrict or dilate, variances in luminosity may be used to enhance or facilitate the three-dimensional effects described herein.

Generally, modern display devices are capable of changing luminosity in response to a user command or ambient light condition. Embodiments may include a command as part of the display stream to adjust luminosity regardless of changes in ambient light or user input. Thus, additional visual effects may be achieved or the foregoing visual effects enhanced.

Such luminosity changes may be made on a whole image basis, or on a pixel-by-pixel basis. The latter may be useful, for example, to further emphasize particular elements or objects on a display, such as those upon which a viewer should focus. Luminosity changes may be created digitally be emphasizing or deemphasizing certain pixels in a frame or may be created in an analog fashion through the use of dynamic lighting and/or filtering.

VII. Conclusion

Embodiments have been discussed that may create, enhance, facilitate or simulate three-dimensional effects through the use of changing focal points, changing apertures, luminosity variances, varying depths of field, and so on. It should be understood that any or all of these methods may be used together to create and/or enhance a simulated three-dimensional image that is displayed on a conventional, two-dimensional display device. Thus, for example, certain embodiments may create and/or process an output stream that includes frames and/or GOPs having differing depths of field, focal points and luminosity all operating together to fool the human eye into perceiving a three-dimensional image. The exact techniques used to construct the output stream (and, likewise, to use the output stream to create a display stream for display on a conventional two-dimensional display device) may vary by embodiment.

Although the foregoing has described particular systems, embodiments and methods, it should be understood that alternative embodiments may occur to those of ordinary skill in the art upon reading this document. For example, when creating an output stream having multiple depth planes sufficiently far away, individual cameras may be used to capture images in each depth plane and simply placed close to one another. In such an embodiment, each image captured by each camera may be translated to a common origin point. As yet another example, the camera 300 of FIG. 3 may capture a larger field of view through each lens 305, 310, 315 than is shown in the final output stream, and non-overlapping portions of each series of pictures may be cropped. In view of the above disclosure and the ordinary skill of one in the art, the following is claimed:

I claim:

1. A method for creating an output stream that simulates a three dimensional image when displayed on a display, comprising:
   capturing a first series of frames having a first depth of field corresponding to a first focal point;
   capturing a second series of frames having a second depth of field different than the first depth of field;
   capturing at least a third series of frames having a third depth of field different than the first and second depth of field; and
   forming an output stream by interleaving the first, second, and third series of frames such that, when reproduced on the display, the displayed frames vary between the first, second, and third series of frames to create the illusion of a three-dimensional image, and a number of frames of the second series of frames being selected based upon an amount of motion between frames of the first and third series of frames.

2. The method of claim 1, wherein the operation of capturing the second series of frames comprises capturing a series of frames having a second depth of field corresponding to the second focal point, having a different focal distance to the first focal point; and
   focusing on a first focal point comprises setting an aperture of an image capture device; and
   focusing on a second focal point comprises changing the aperture of the image capture device.

3. The method of claim 2, wherein:
   the operation of capturing the first series of frames occurs for a time T1; and
   the operation of capturing the second series of frames occurs for a time T2.

4. The method of claim 3, further comprising:
   capturing a third series of frames having the first depth of field.

5. The method of claim 4, wherein the operation of capturing the third series of frames occurs after the time T2.

6. The method of claim 1, wherein:
   the operation of capturing the second series of frames comprises capturing a series of frames having a second depth of field corresponding to a second focal point, having a different focal distance to the first focal point; and wherein the method further comprises:
   focusing on the first focal point by dynamically refocusing from another focal point of an image capture device; and
   focusing on the second focal point by dynamically refocusing from another focal point of the image capture device.

7. The method of claim 1, further comprising varying a luminosity of at least one of the first and second series of frames.

8. The method of claim 1, wherein the second set of frames is captured at a different focal length than the first image set of frames.

9. A method for creating an output stream, comprising:
   capturing a first series of frames having a first depth of field corresponding to a first focal point;
   capturing a second series of frames having a second depth of field different than the first depth of field;
   capturing at least a third series of frames having a third depth of field different than the first and second depth of field; and
   interleaving the first, second, and third series of frames such that, when reproduced on a display, the displayed frames vary between the first, second, and third series of frames to create the illusion of a three-dimensional image, and a number of frames of the second series of frames is selected based upon an amount of motion between frames of the first and third series of frames; and
   compressing the interleaved first, second, and third series of frames to create the output stream.

10. The method of claim 9, wherein the operation of compressing comprises:
    creating at least one P-frame resident between a first frame and a second frame of the interleaved first, second, and third series of frames;
    wherein the at least one P-frame is encoded based on a changing depth of field between the first frame and the second frame.

11. The method of claim 1, wherein: the luminosity of at least the portion of the first series of frames enhances an object in the first series of frames.

12. The method of claim 7, wherein varying the luminosity comprises:
    increasing or decreasing the luminosity of a first portion of pixels in a particular frame and not a second portion of pixels in another particular frame.

13. The method of claim 1, wherein the second series of frames has the same focal point as the first series of frames.

14. The method of claim 2, wherein the field of view remains the same for both the first and second focal points.

* * * * *

UNITED STATES PATENT AND TRADEMARK OFFICE
CERTIFICATE OF CORRECTION

PATENT NO. : 8,633,968 B2  
APPLICATION NO. : 12/636570  
DATED : January 21, 2014  
INVENTOR(S) : John T. Kennedy Page 1 of 1

It is certified that error appears in the above-identified patent and that said Letters Patent is hereby corrected as shown below:

In the Claims:

Column 14, line 8, please delete "image" between 'first' and 'set'.

Signed and Sealed this  
Thirteenth Day of May, 2014

Michelle K. Lee  
*Deputy Director of the United States Patent and Trademark Office*